(12) United States Patent
Furuya

(10) Patent No.: US 8,820,968 B2
(45) Date of Patent: Sep. 2, 2014

(54) WAVELENGTH CONVERSION ELEMENT, LASER LIGHT SOURCE DEVICE, IMAGE DISPLAY DEVICE, AND METHOD OF MANUFACTURING WAVELENGTH CONVERSION ELEMENT

(71) Applicant: Panasonic Corporation, Osaka (JP)

(72) Inventor: Hiroyuki Furuya, Kumamoto (JP)

(73) Assignee: Panasonic Corporation, Osaka (JP)

( * ) Notice: Subject to any disclaimer, the term of this patent is extended or adjusted under 35 U.S.C. 154(b) by 2 days.

(21) Appl. No.: 13/648,661

(22) Filed: Oct. 10, 2012

(65) Prior Publication Data

US 2013/0094214 A1 Apr. 18, 2013

(30) Foreign Application Priority Data

Oct. 13, 2011 (JP) .................................. 2011-226078

(51) Int. Cl.
G02B 27/20 (2006.01)
G02F 1/355 (2006.01)
F21V 9/00 (2006.01)

(52) U.S. Cl.
CPC .. *F21V 9/00* (2013.01); *G02F 1/355* (2013.01)
USPC ........... 362/259; 359/326; 359/332; 264/436; 353/20

(58) Field of Classification Search
USPC ................... 362/259; 359/326, 332; 427/532; 216/24; 372/102; 353/20
See application file for complete search history.

(56) References Cited

U.S. PATENT DOCUMENTS

| | | | |
|---|---|---|---|
| 6,926,770 B2 * | 8/2005 | Peng et al. ......................... 117/2 |
| 7,413,635 B2 * | 8/2008 | Essaian .......................... 204/164 |
| 7,652,815 B2 * | 1/2010 | Huang et al. ................... 359/326 |
| 2004/0192040 A1 * | 9/2004 | Peng et al. ..................... 438/689 |
| 2005/0133477 A1 * | 6/2005 | Esseian ........................... 216/24 |
| 2008/0174736 A1 * | 7/2008 | Huang et al. ..................... 353/20 |
| 2008/0231942 A1 * | 9/2008 | Huang et al. ................... 359/326 |
| 2009/0028207 A1 * | 1/2009 | Huang et al. ................... 372/102 |
| 2012/0152892 A1 | 6/2012 | Morikawa et al. |

FOREIGN PATENT DOCUMENTS

| | | |
|---|---|---|
| JP | 10-161167 | 6/1998 |
| JP | 2000-103697 | 4/2000 |
| JP | 2001-059983 | 3/2001 |
| JP | 2001-242498 | 9/2001 |

(Continued)

OTHER PUBLICATIONS

K. Mizuuchi et al., "High-Power Continuous Wave Green Generation . . . ," Journal Applied Physics, vol. 42, (2003), pp. 1296-1298.

(Continued)

*Primary Examiner* — Thomas A Hollweg
(74) *Attorney, Agent, or Firm* — Greenblum & Bernstein, P.L.C.

(57) ABSTRACT

A method of manufacturing a wavelength conversion element can control a formation process of a polarization inversion structure with single crystalline magnesium-doped lithium niobate having a congruent composition, and can stably manufacture wavelength conversion elements having high conversion efficiency. The method involves forming periodic electrodes on the +z face of an MgLN substrate and forming an opposite electrode on the −z face of the MgLN substrate; heat-treating the substrate after forming the periodic electrodes and the opposite electrode; and applying a pulsed electric field between the periodic electrodes and the opposite electrode while holding the MgLN substrate at a temperature of 100° C. or higher. The wavelength conversion element has a polarization inversion structure formed by applying an electric field to a heat-treated MgLN substrate.

13 Claims, 15 Drawing Sheets

(56) References Cited

FOREIGN PATENT DOCUMENTS

| | | |
|---|---|---|
| JP | 2002-103697 | 4/2002 |
| JP | 2011-048206 | 3/2011 |
| WO | WO2011/045893 | 4/2011 |

OTHER PUBLICATIONS

K. Mizuuchi et al., "Continuous-wave ultraviolet generation . . . ," Applied Physics Letters, vol. 85, No. 18 (Nov. 1, 2004), pp. 3959-3961.

* cited by examiner (a) EXAMPLE OF A GOOD ELEMENT (b) EXAMPLE OF A DEFECTIVE ELEMENT (a) EXAMPLE OF A GOOD ELEMENT (b) EXAMPLE OF A DEFECTIVE ELEMENT (a) CHANGES IN APPLIED VOLTAGE (b) WAVELENGTH CONVERSION CHARACTERISTICS (a) UNTREATED (b) HEAT-TREATED

WAVELENGTH CONVERSION ELEMENT, LASER LIGHT SOURCE DEVICE, IMAGE DISPLAY DEVICE, AND METHOD OF MANUFACTURING WAVELENGTH CONVERSION ELEMENT

CROSS REFERENCE TO RELATED APPLICATIONS

This application is entitled to the benefit of Japanese Patent Application No. 2011-226078 filed on Oct. 13, 2011, the disclosure of which including the specification, drawings and abstract is incorporated herein by reference in its entirety.

TECHNICAL FIELD

The present invention relates to a wavelength conversion element that converts laser light emitted from a laser light source by a nonlinear optical effect, a laser light source apparatus, an image display apparatus, and a method of manufacturing the wavelength conversion element.

BACKGROUND ART

Wavelength conversion laser light sources have been developed and commercially available which convert light (fundamental waves) emitted from laser media such as Nd:YAG lasers and Nd:YVO4 lasers into visible green light (harmonic waves), and, further convert the green light into ultraviolet light by wavelength conversion by a nonlinear optical effect. These visible laser light and ultraviolet laser light are used in various applications, such as laser beam machining of materials and light sources for laser displays.

Nonlinear optical crystals having birefringence need to be used to achieve the nonlinear optical effect, which crystals are manufactured by periodical polarization inversion of ferroelectric nonlinear crystals such as $LiNbO_3$ (lithium niobate: PPLN).

FIG. 1 is a schematic view illustrating the outline configuration of a wavelength conversion laser light source. FIG. 1 shows the configuration example of an end-pump laser light source that receives excitation light from an end face of a laser medium.

As shown in FIG. 1, wavelength conversion laser light source 10 includes excitation light source 11, collimator lens 13, collecting lens 14, solid-state laser medium 15, wavelength conversion element 16, concave mirror 22, and optical reflection film 23.

Solid-state laser medium 15, wavelength conversion element 16, and concave mirror 22 build up laser resonator 24.

Wavelength conversion element 16 is an SHG (second harmonic generation) element, which converts the wavelength of fundamental wavelength laser light (infrared laser light) of a 1064 nm wavelength outputted from solid-state laser medium 15 to generate half-wavelength laser light (green laser light) having a 532 nm wavelength.

Wavelength conversion laser light source 10 excites solid-state laser medium 15 with excitation light source 11, and converts the generated near-infrared light to green laser light with wavelength conversion element 16.

Excitation light 12 is emitted from excitation light source 11, is collimated by collimator lens 13, and then is focused onto solid-state laser medium 15 building up laser resonator 24 through collecting lens 14.

Solid-state laser medium 15 is a YVO4 crystal, which is a single crystalline material. Solid-state laser medium 15 has an end face (optical reflection film) 18 which the excitation light is incident on. On the end face, high reflective optical film 18 is formed that reflects light of a 1060 nm band. High reflective optical film 18 functions as a resonator. High reflective optical film 23 that reflects the light of a 1060 nm band is also formed on an end face of concave mirror 22. Concave mirror 22 also functions as a resonator.

End face 19 of solid-state laser medium 15 and end face 20 of wavelength conversion element 16 face each other and are provided with respective non-reflective optical films. That is, the non-reflective optical films are formed on the face, opposite to wavelength conversion element 16, of solid-state laser medium 15 and on the face, opposite to solid-state laser medium 15, of wavelength conversion element 16, respectively. Laser resonator 24 operates as an optical resonator that resonates light between high reflective optical films 18 and 23 formed on the end faces of solid-state laser medium 15 and concave mirror 22, respectively, to cause oscillation of laser light of a 1060 nm band.

At this moment, the oscillating light of a 1060 nm band passes through wavelength conversion element 16 to be converted to light with an approximately 530 nm wavelength (green light), i.e., half-wavelength. Converted harmonic wave light (green light) 17 of 530 nm is then outputted from end face 21 of wavelength conversion element 16.

Wavelength conversion element 16 is composed of, for example, lithium triborate ($LiB_3O_5$:LBO), which is a dielectric single crystalline material, potassium titanyl phosphate ($KTiOPO_4$:KTP), magnesium-doped lithium niobate (Mg:$LiNbO_3$) having a periodic polarization inversion structure, and magnesium-doped lithium tantalate (Mg:$LiTaO_3$) having a periodic polarization inversion structure.

Among them, magnesium-doped lithium niobate having a polarization inversion structure, which has a large nonlinear optical constant, takes full advantage of the large nonlinear optical constant by the polarization inversion structure. The magnesium-doped lithium niobate having the polarization inversion structure has a benefit of inhibiting a change in refractive index depending on light (light damaging) by magnesium ions.

As a result, the magnesium-doped lithium niobate having the polarization inversion structure used as a wavelength conversion element can function as a green laser light source with high output and high efficiency.

Ideally, the ratio of an inversion region to a non-inversion region of the polarization inversion structure should be 1:1 in order to achieve high efficiency of the wavelength conversion element.

Patent Literatures 1 and 2 describe magnesium-doped lithium niobate, magnesium-doped lithium tantalate single crystal, and an optical functional element prepared a special crystal deposition system, where the crystal has a specific crystal composition, i.e. a mole fraction $Li_2O/(Nb_2O_5+Li_2O)$ (stoichiometric composition) of 0.49 to 0.52. They also describe an attempt to decrease an applied voltage to form the polarization inversion structure and to provide an ideal ratio of the inversion region to the non-inversion region of the polarization inversion structure using single crystals of the magnesium-doped lithium niobate and magnesium-doped lithium tantalate.

Patent Literature 3 describes a method of manufacturing a wavelength conversion element that outputs stable harmonic waves even during a long-time operation by reducing a change in phase matching temperature. The method of manufacturing the wavelength conversion element disclosed in Patent Literature 3 involves formation of a polarization inversion layer and heat treatment after removal of electrodes, where the temperature of the heat treatment is 85° C. or less.

CITATION LIST

Patent Literature

PTL 1
Japanese Patent Application Laid-Open No. 2000-103697
PTL 2
Japanese Patent Application Laid-Open No. 2001-59983
PTL 3
Japanese Patent Application Laid-Open No. 2011-48206

SUMMARY OF INVENTION

Technical Problem

Unfortunately, growing the magnesium-doped lithium niobate and the single crystalline magnesium-doped lithium tantalate with a mole fraction of 0.49 to 0.52 (stoichiometric composition) described in PTL 1 and PTL 2 requires a special crystal growth apparatus that can supply raw materials during 1.5 crystal growth, which precludes the production of a magnesium-doped lithium niobate single crystal and an optical functional element.

It is therefore expected to stably produce highly efficient wavelength conversion elements using the magnesium-doped lithium niobate and the magnesium-doped lithium tantalate with a mole fraction of 0.485 to 0.49 (congruent composition) that are conventionally manufactured.

The method of manufacturing a wavelength conversion element described in PTL 3 intends to prevent the instability of output due to a temporal change in the phase matching temperature and a decrease in conversion efficiency caused thereby, not to improve the manufacturing yield.

An object of the present invention is to provide a wavelength conversion element, a laser light source apparatus, an image display apparatus, and a method of manufacturing the wavelength conversion element that can control a formation process of a polarization inversion structure with single crystalline magnesium-doped lithium niobate having a congruent composition, and can stably manufacture wavelength conversion elements with a high conversion efficiency.

Solution to Problem

According to the present invention, a method of manufacturing a wavelength conversion element that forms a polarization inversion structure on a substrate of single crystalline magnesium-doped lithium niobate having a congruent composition includes the steps of: forming periodic electrodes on the +z face of the substrate and forming an opposite electrode on the −z face of the substrate; heat-treating the substrate after forming the electrodes; and applying a pulsed electric field between the periodic electrodes and the opposite electrode after the heat treatment.

According to the present invention, the wavelength conversion element having the polarization inversion structure formed on the substrate of single crystalline magnesium-doped lithium niobate having a congruent composition has a volume resistivity between the +z face and the −z face of the substrate in the range of 9 to 5 MΩ·cm at a substrate temperature of 100° C. or higher.

A laser light source apparatus according to the present invention includes the wavelength conversion element.

An image display apparatus according to the present invention includes the laser light source apparatus.

Advantageous Effects of Invention

According to the present invention, the process of forming the polarization inversion structure is controlled using single crystalline magnesium-doped lithium tantalate with a congruent composition. As a result, wavelength conversion elements with a high conversion efficiency can be stably manufactured at a high production yield. Wavelength conversion elements with a high efficiency can also be obtained.

DESCRIPTION OF EMBODIMENTS

The embodiments of the present invention will now be described in detail with reference to the attached drawings.

(Embodiment 1)

Figure 1:
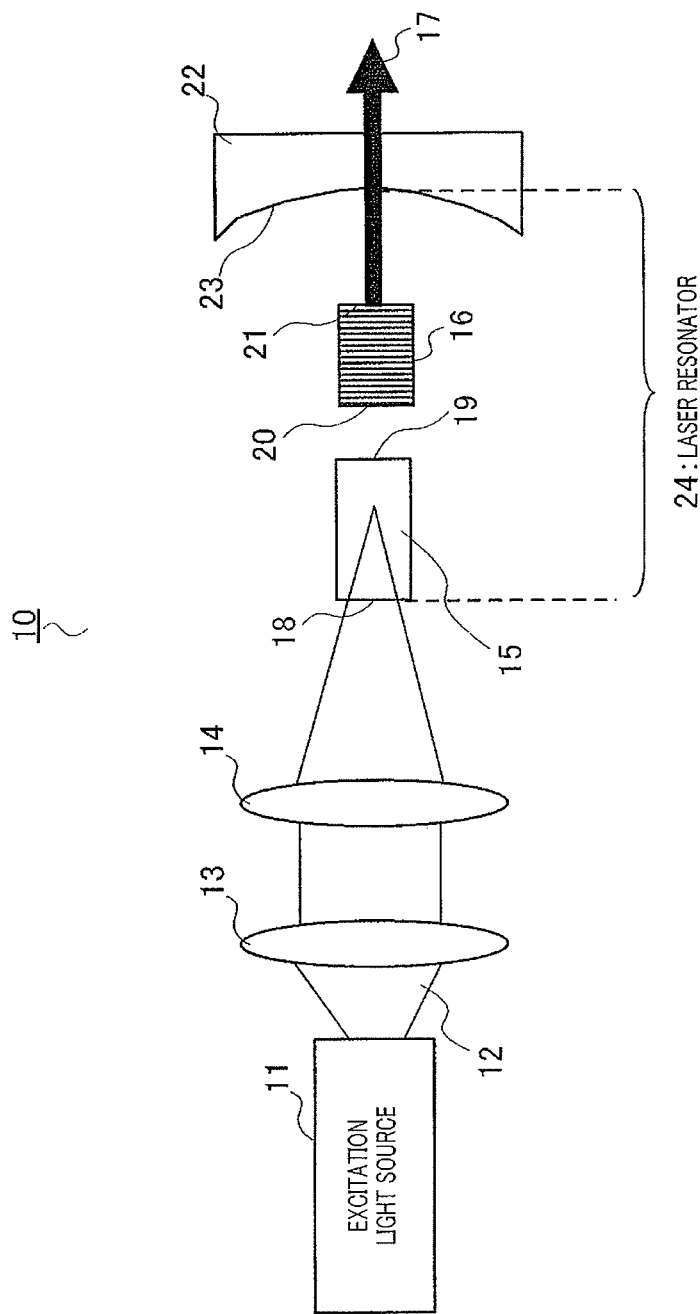
FIG. 1 is a schematic view illustrating the outline configuration of a wavelength conversion laser light source.
Figure 2:
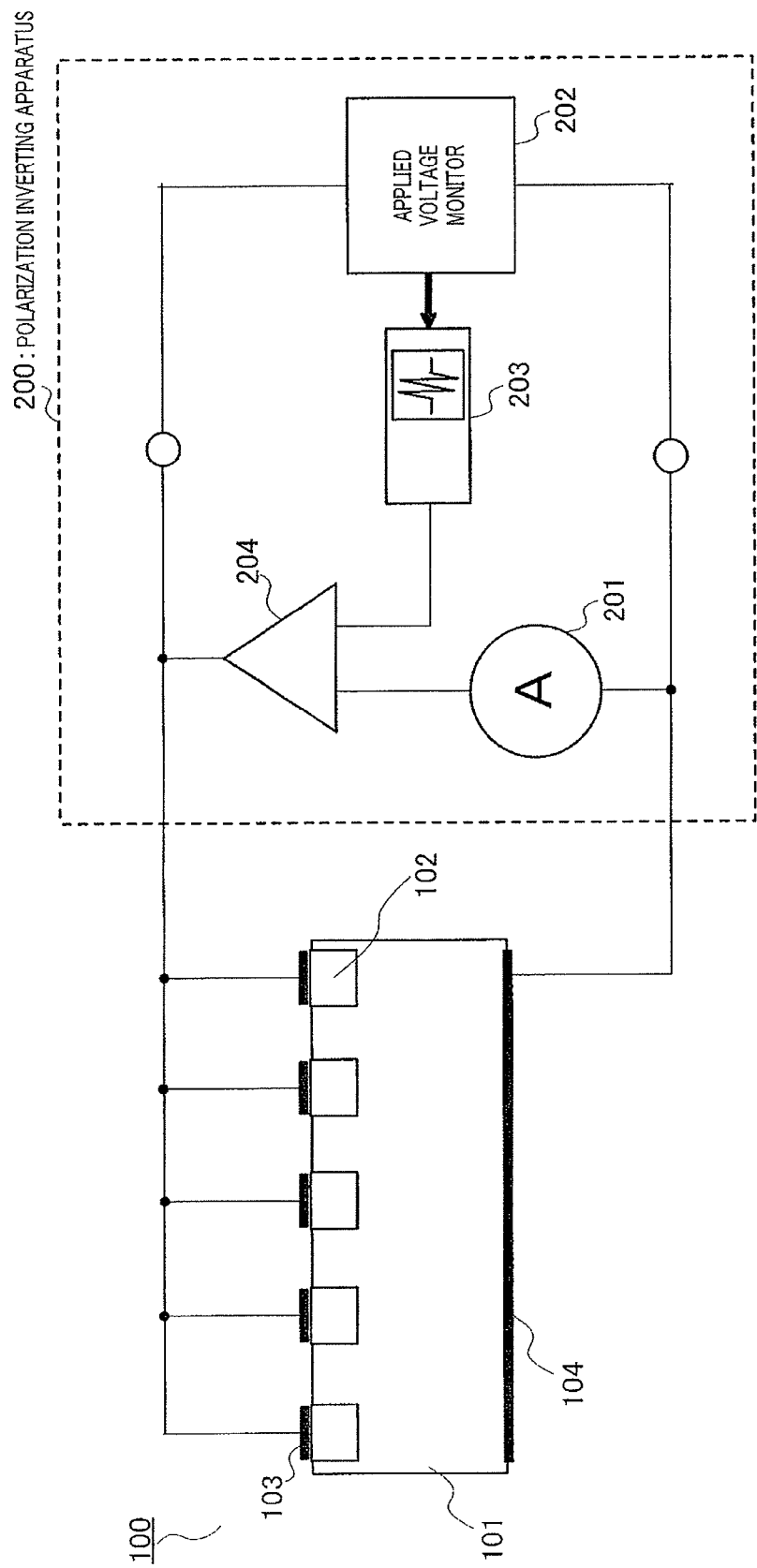
FIG. 2 is a schematic view illustrating the outline configuration of an electric field applying apparatus for use in a method of manufacturing a wavelength conversion element according to Embodiment 1 of the present invention.

FIG. 2 is a schematic view illustrating the outline configuration of an electric field applying apparatus for use in a method of manufacturing a wavelength conversion element according to Embodiment 1 of the present invention.

Wavelength conversion element 100 shown in FIG. 2 is provided with a polarization inversion structure on substrate 101 of a single crystalline lithium niobate doped with magnesium (referred to as "MgLN substrate" hereinafter) with a mole fraction of 0.485 to 0.49 (congruent composition). Wavelength conversion element 100 has a volume resistivity in the range of 9 to 5 MΩ·cm between the front surface (referred to as +z face hereinafter) and the rear surface (referred to as −z face hereinafter) of MgLN substrate 101 at a substrate temperature of 100° C. or higher.

Wavelength conversion element 100 has periodic electrodes on the +z face and an opposite electrode on the −z face of MgLN substrate 101. Wavelength conversion element 100 is heat-treated after the electrodes are formed. In wavelength conversion element 100 according to the present embodiment, heat-treated MgLN substrate 101 is provided with the polarization inversion structure formed by applying an electric field. The opposite electrode may be referred to as a uniform electrode.

Wavelength conversion element 100 is approximately rectangular. Wavelength conversion element 100 has periodic electrodes 103 and opposite electrode 104. Polarization inverting apparatus 200 applies a pulsed electric field across periodic electrodes 103 and opposite electrode 104 of MgLN substrate 101. Thereby periodic polarization inversion regions (polarization inversion layers) 102 are formed on MgLN substrate 101.

Fundamental wavelength laser light is incident on wavelength conversion element 100 in the periodic direction of the polarization inversion (an array direction of polarization inversion regions 102). This generates the second harmonic waves of the incident light, in other words laser light with a doubled frequency, i.e., a half wavelength by quasi-phase matching.

In order to form the periodic polarization inversion structure, an electric field is applied across periodic electrodes 103 and opposite electrode 104 in a direction to the polarization opposite to a single-polarized ferroelectric crystal. Thus, the polarization direction of regions corresponding to periodic electrodes 103 reverses, and a wedge of polarization inversion regions 102 is formed from periodic electrodes 103 towards opposite electrode 104.

Polarization inverting apparatus 200 includes DC current source 201, applied voltage monitor 202, waveform generator 203, and amplifier 204.

Polarization inverting apparatus 200 applies a high voltage to MgLN substrate 101, and controls at a constant value the electric current that flows when the polarization inversion structure is produced.

Applied voltage monitor 202 monitors the voltage value applied to MgLN substrate 101. Applied voltage monitor 202 can thus monitor the state of the process of forming the polarization inversion structure in MgLN substrate 101. The detail of the monitoring method will be described later.

Waveform generator 203 generates a pulse waveform. Amplifier 204 amplifies the generated pulse waveform to apply to MgLN substrate 101. The voltage applied to MgLN substrate 101 is a pulsed electric field.

Figure 3:
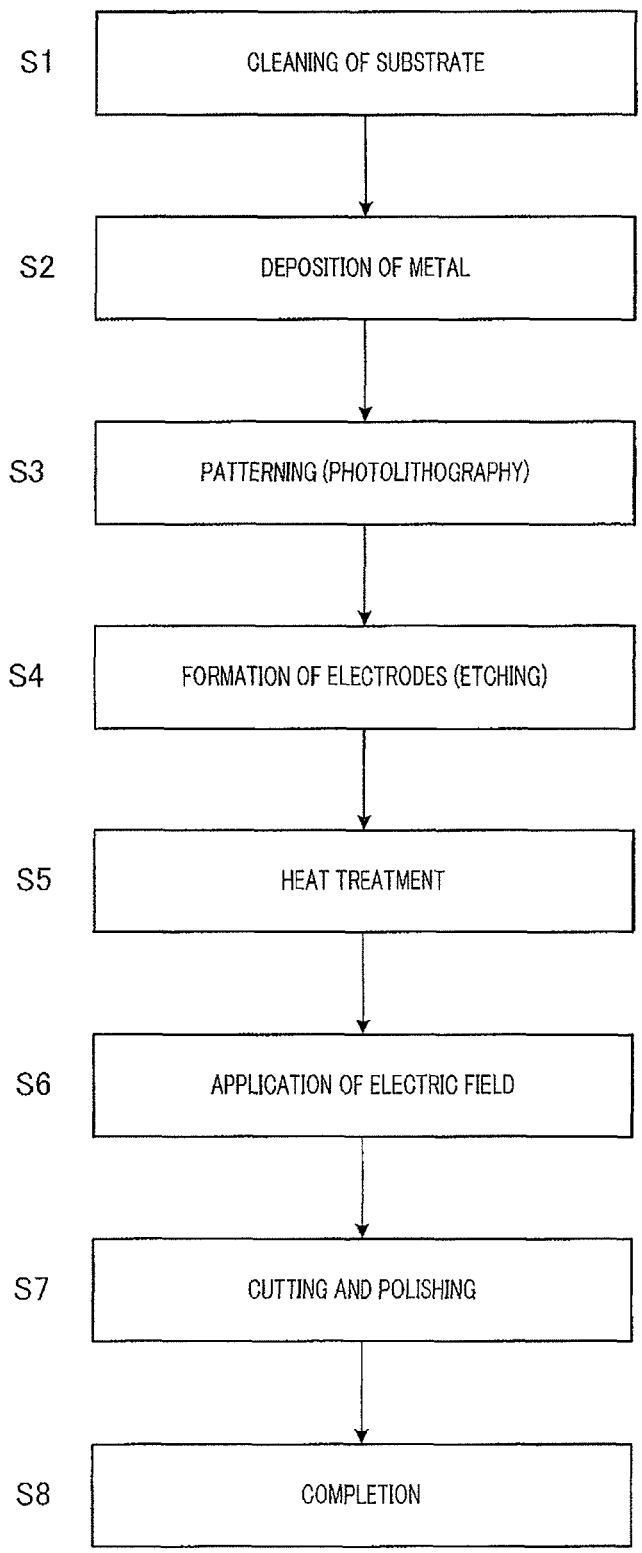
FIG. 3 is a process chart showing the method of manufacturing the wavelength conversion element according to Embodiment 1.

FIG. 3 is a process chart showing a method of manufacturing the wavelength conversion element according to the present embodiment, which chart shows the process of forming the polarization inversion in the wavelength conversion element.

The present embodiment uses MgLN substrate 101 with a mole fraction of 0.485 to 0.49 (congruent composition) as a material substrate. Thus, the embodiment describes process conditions when the MgLN substrate is used.

Step S1: Cleaning Substrate

MgLN substrate 101 with congruent composition as a material substrate is cleaned.

Step S2: Depositing Metal

A metal material for electrodes is deposited on the front and rear surfaces of cleaned MgLN substrate 101 in a sputtering system. The metal film may be composed of any material that can adhere tightly to the MgLN substrate, for example, aluminum, chromium, tantalum, or titanium.

Step S3: Patterning

A photoresist is applied on MgLN substrate 101 provided with the metal film with a coater/developer, is exposed through a mask pattern, and is resist-patterned by photolithography. The resist patterning develops a photoresist pattern to form periodic electrodes corresponding to a polarization inversion pattern.

Step S4: Forming Electrodes

An electrode pattern for applying an electric field is formed by etching a metal film through a mask of the patterned resist.

Step S5: Heat Treatment

Figure 4:
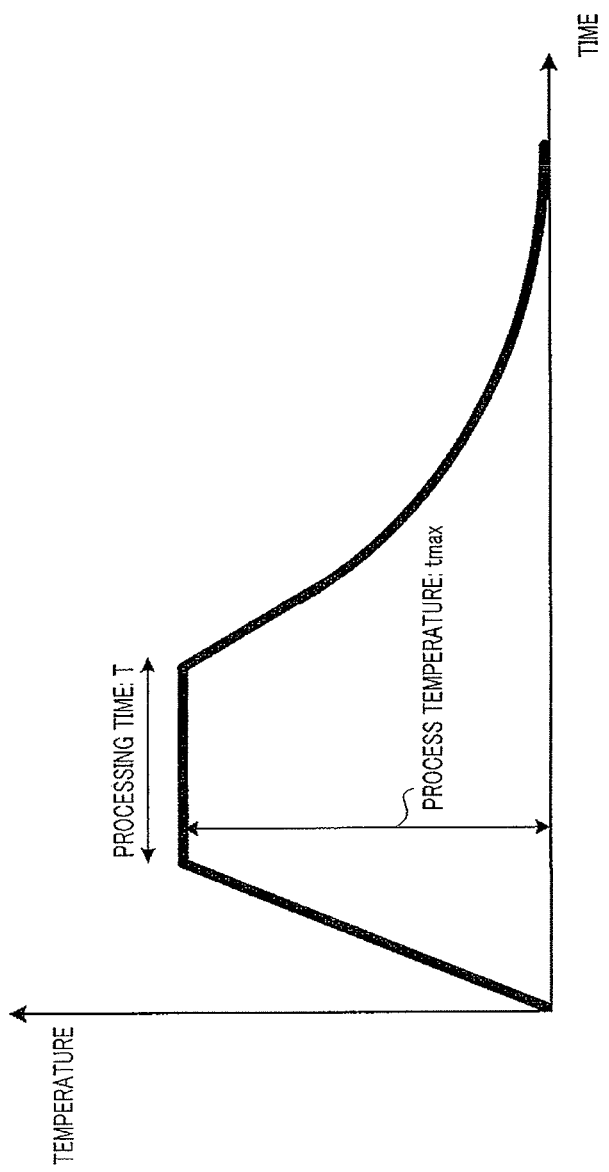
FIG. 4 is a graph showing a temperature profile of heat treatment before applying the electric field in the method of manufacturing the wavelength conversion element according to Embodiment 1.

MgLN substrate 101 is heat-treated in accordance with a temperature profile shown in FIG. 4 after forming electrodes before applying the electric field.

FIG. 4 shows a temperature profile of the heat treatment before the electric field is applied. In FIG. 4, the process temperature tmax indicates a maximum temperature during the heat treatment and the processing time T indicates a holding time at the maximum temperature tmax.

Here, a first characteristic of the process of forming polarization inversion for wavelength conversion element 100 is heat treatment after electrodes are formed. The heat treatment is performed in accordance with the temperature profile in FIG. 4 after the electrodes are formed. In the present embodiment, the process temperature tmax is set to 200° C. and the holding time T is set to 1 hour. The process temperature preferably ranges from 160° C. to 250° C. No effect of heat treatment is observed at 160° C. or lower and the oxidation of electrodes impairs wavelength conversion characteristics at 250° C. or higher. A holding time of 30 minutes or more leads to no difference in effect within the range of the process temperature described above. The heating rate to the process temperature is set to be 5 to 10° C. per minute. If the heating rate is higher than that, a lithium niobate substrate of piezoelectric crystal would most likely be damaged. The heating rate is determined for such a reason.

Step S6: Applying Electric Field

Metal electrodes formed on the front and rear surfaces are connected to polarization inverting apparatus 200 (see FIG. 2), and a pulsed electric field is applied thereto. Applying the pulsed electric field displaces crystal orientation of the pattern formation region of periodic electrodes 103 based on atom migration in the crystal, and inverting polarization orientation forms polarization inversion regions 102 in the pattern formation region of periodic electrodes 103.

A second characteristic of the process of forming polarization inversion for wavelength conversion element 100 is a holding temperature of the MgLN substrate when the polarization inversion structure is formed. That is, holding the temperature of MgLN substrate 101 in the range of 100 to 150° C. vibrates the lattice of the MgLN single crystal to facilitate displacement of lithium ions constituting the MgLN, thus lowering a polarization inversion voltage. As noted above, the present embodiment controls at a constant value the electric current that flows when the polarization inversion structure is produced. Applied voltage monitor 202 (see FIG. 2) monitors a voltage value applied to MgLN substrate 101. Applied voltage monitor 202 monitors the formation state of the polarization inversion structure, and stops the application of the electric field after the polarization inversion structure is completed.

Step S7: Cutting and Polishing

MgLN substrate 101 provided with the polarization inversion structure is cut and optically polished.

Step S8: Completion

Wavelength conversion element 100 is completed. Completed wavelength conversion element 100 has periodic electrodes on the +z face and a uniform electrode on the −z face of MgLN substrate 101. Wavelength conversion element 100 provided with the electrodes is heat-treated. A polarization inversion structure is formed on MgLN substrate 101 of wavelength conversion element 100. MgLN substrate 101 has a volume resistivity across the +z face and the −z face of the substrate in the range of 9 to 5 MΩ·cm at a substrate temperature of 100° C. or higher.

Evaluation of wavelength conversion characteristics of completed wavelength conversion element 100 will now be described.

Figure 5:
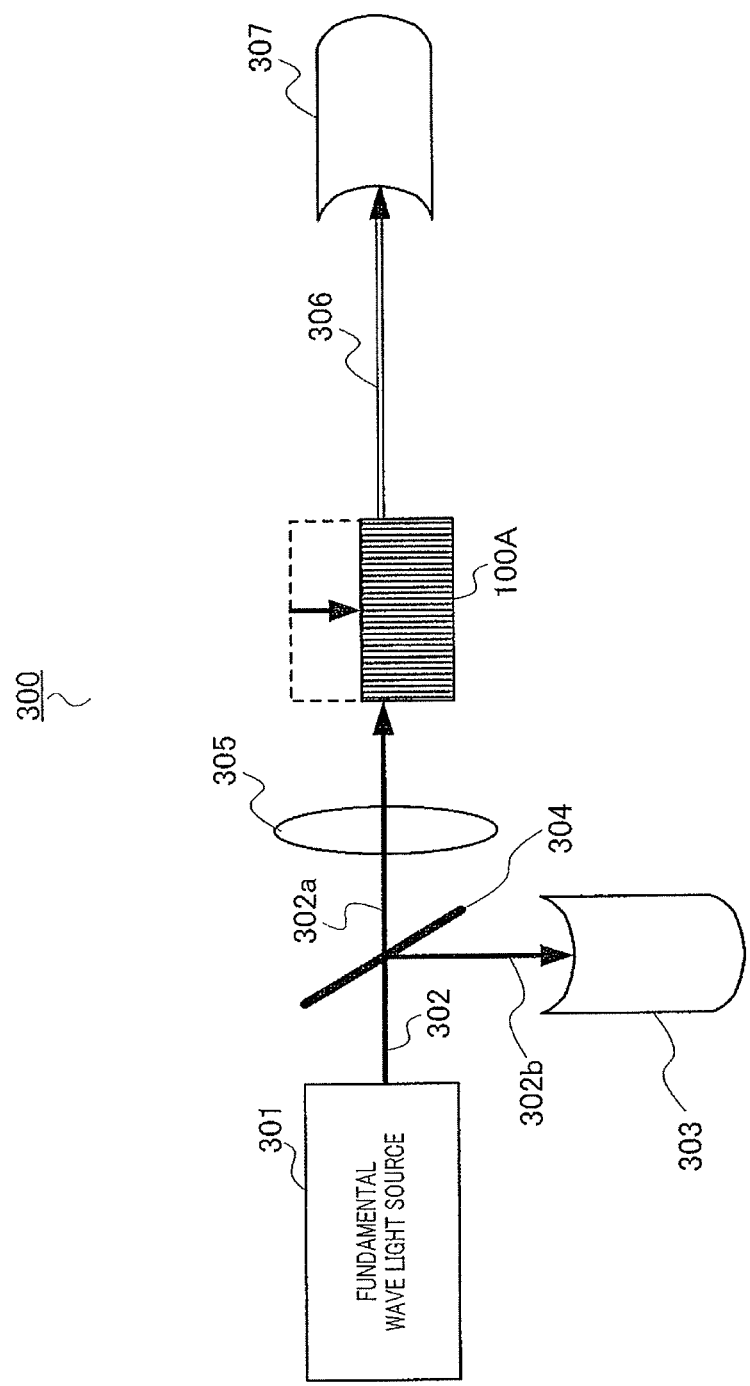
FIG. 5 is a schematic view illustrating the outline configuration of an optical system to evaluate characteristics of the wavelength conversion element in the method of manufacturing the wavelength conversion element according to Embodiment 1.
Figure 6:
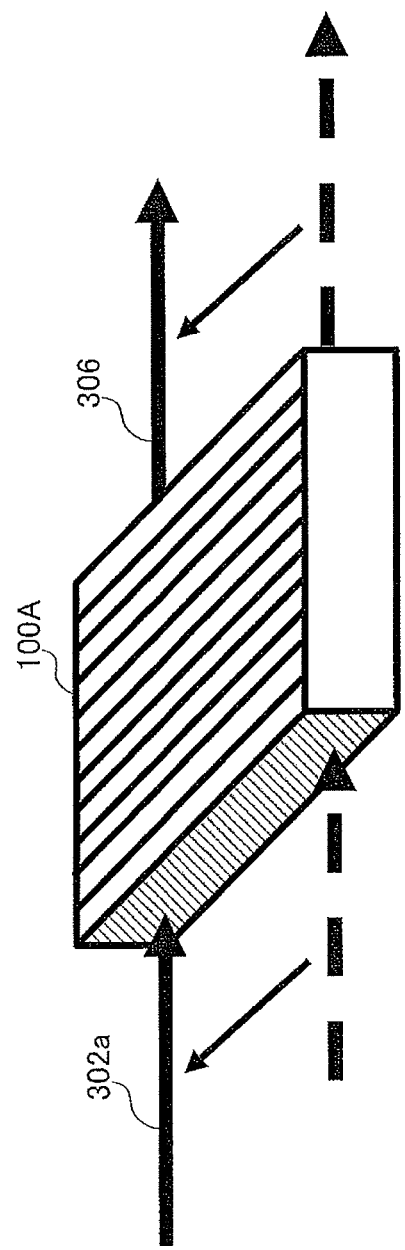
FIG. 6 is an enlarged view of the main part of the wavelength conversion element shown in FIG. 5.

FIG. 5 is a schematic view illustrating the outline configuration of an optical system to evaluate characteristics of the wavelength conversion element. FIG. 6 is an enlarged view of the main part of the wavelength conversion element shown in FIG. 5.

Wavelength conversion element 100A shown in FIGS. 5 and 6 represents wavelength conversion element 100 to be measured.

Optical system 300 to evaluate wavelength conversion efficiency includes fundamental wave light source 301, power meter 303 to monitor the fundamental wave, beam splitter 304, collecting lens 305, and power meter 307 to monitor green light.

Beam splitter 304 separates fundamental wave light 302 (of a 1064 nm wavelength) emitted from fundamental wave light source 301 into fundamental wave light beams 302a and 302b. Fundamental wave light beam 302b is used to monitor the intensity of fundamental wave light beam 302a. Fundamental wave light beam 302a is collected by collecting lens 305, and is incident on wavelength conversion element 100A to be measured.

A portion of fundamental wave 302a incident on wavelength conversion element 100A is converted into harmonic wave 306 (green light of 532 nm). Power meter 307 to monitor green light measures the intensity of converted harmonic wave 306. Comparison of the intensity of the harmonic wave (green light of 532 nm) measured by power meter 307 with the input value of fundamental wave light 302a determines the wavelength conversion efficiency.

Up on the evaluation of the wavelength conversion efficiency, the in-plane uniformity of a polarization inversion structure is also evaluated by displacing a position on wavelength conversion element 100A on which fundamental wave light 302a is incident. FIG. 6 schematically illustrates this procedure. As shown in FIG. 6, the position of fundamental wave light 302a is displaced within a substrate surface, and the distribution of the conversion efficiency is measured to evaluate the in-plane uniformity.

Background on why heat treatment process was introduced before applying an electric field will now be described.

Figure 7:
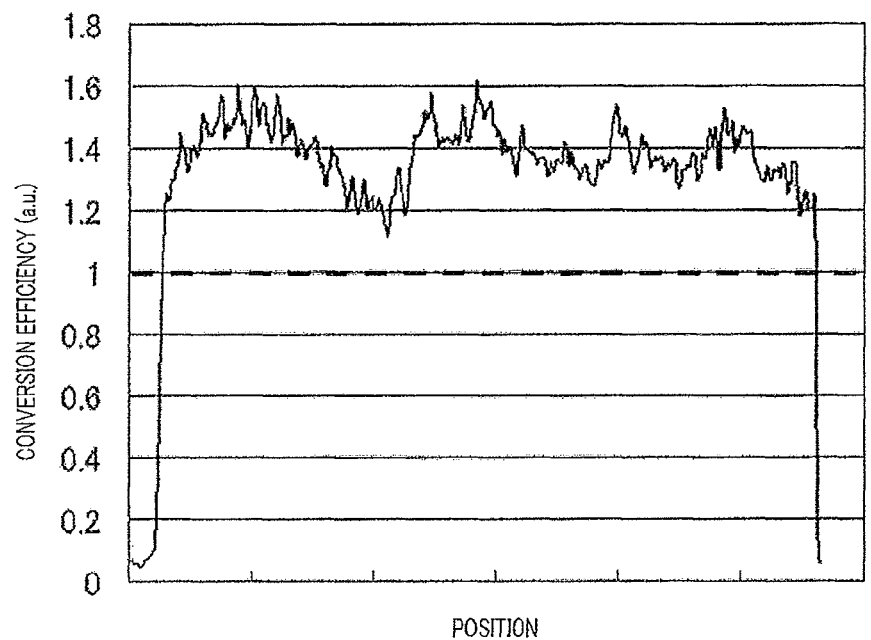
FIG. 7 includes charts plotting the results of evaluation of wavelength conversion efficiency of SHG elements manufactured by a conventional method of manufacturing a wavelength conversion element using an optical system.
Figure 7:
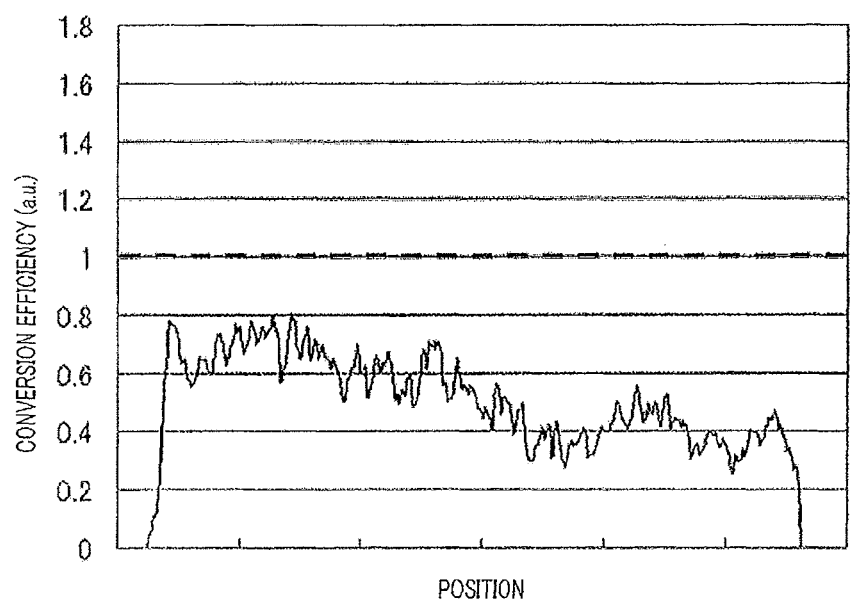

FIG. 7 includes charts plotting the result of evaluating SHG (second harmonics generation) elements manufactured by a conventional method of manufacturing a wavelength conversion element, using optical system 300 to evaluate wavelength conversion efficiency. FIG. 7(a) shows a typical element having a high conversion efficiency manufactured by a conventional process, and FIG. 7(b) shows a typical element having a low conversion efficiency. In FIG. 7(a) and FIG. 7(b), the abscissa indicates the incident position of fundamental wave light 302a and the ordinate indicates wavelength conversion efficiency.

The wavelength conversion efficiency is represented in arbitrary unit, and "1" indicates the target value of the wavelength conversion efficiency. Assuming an ideal polarization inversion structure is formed, the wavelength conversion efficiency is approximately 1.8 as shown at the ordinate in FIG. 7.

In the conventional manufacturing method, the target conversion efficiency is achieved at times as shown in FIG. 7(a) or not be achieved at other times as shown in FIG. 7(b), even if polarization inversion is formed by the same process.

Accordingly, the inventor herein verified applied voltages when polarization inversion occurs during a time from the start to the end of the process of applying an electric field in the case of FIG. 7(a) and FIG. 7(b). FIG. 8(a) and FIG. 8(b) are charts showing the results.

Figure 8:
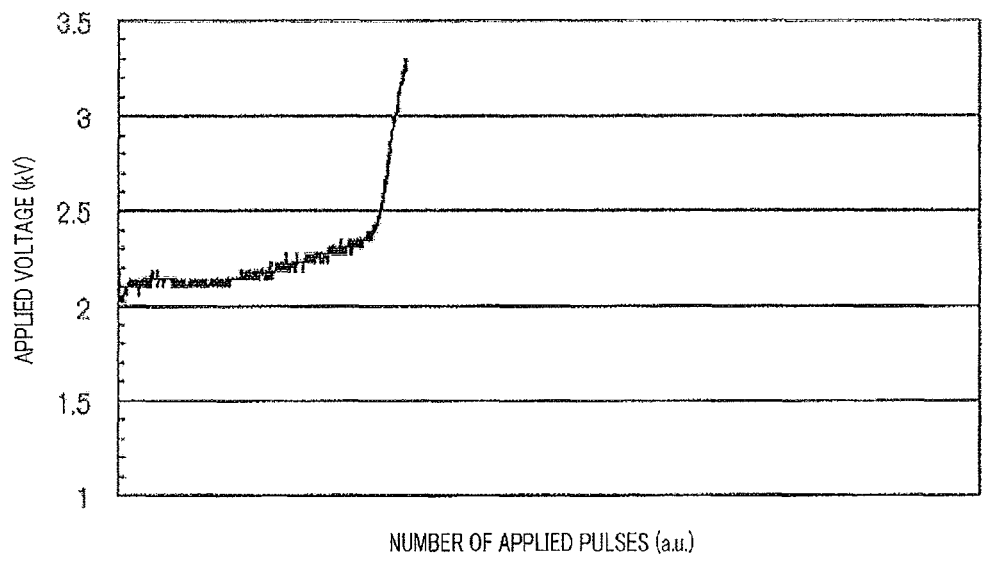
FIG. 8 includes charts plotting a difference associated with applied voltages versus the number of applied pulses in the method of manufacturing the wavelength conversion element according to Embodiment 1.
Figure 8:
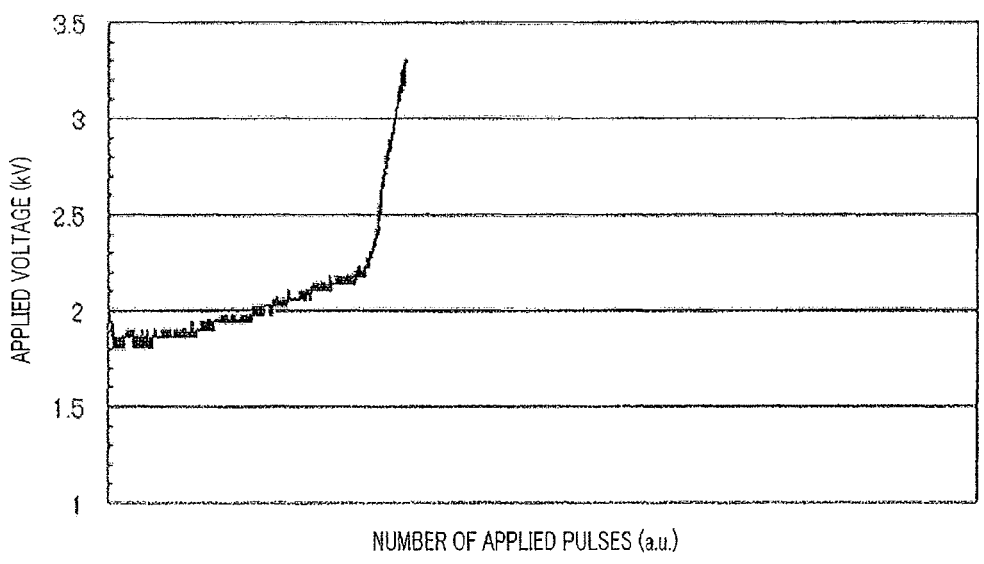

FIG. 8 includes charts plotting a difference in an applied voltage versus the number of applied pulses. FIG. 8(a) shows the relationship between the applied voltage and the number of applied pulses from an element having a high conversion efficiency. FIG. 8(b) shows the relationship between the applied voltage and the number of applied pulses from an element having a low conversion efficiency. In FIG. 8(a) and FIG. 8(b), the abscissa indicates the number of applied pulses counted from the initial stage of the polarization inversion formation, and the ordinate indicates the voltage value applied to an MgLN substrate.

FIG. 8(a), corresponding to FIG. 7(a), is a chart indicating the voltage applied to a wavelength conversion element that achieves the target conversion efficiency. FIG. 8(b), corresponding to FIG. 7(b), is a chart indicating the voltage applied to a wavelength conversion element that does not achieve the target conversion efficiency.

A pulsed electric field is applied across periodic electrodes 103 and opposite electrode 104 of MgLN substrate 101 of wavelength conversion element 100 (see FIG. 2), so that periodic polarization inversion regions 102 are formed on MgLN substrate 101. The electric field applied across periodic electrodes 103 and opposite electrode 104 of MgLN substrate 101 of a dielectric material generates slight electric current flowing in the process of forming the polarization inversion. If pulsed electric fields are applied to MgLN substrate 101 such that an electric current flowing therethrough is kept constant, a voltage applied to MgLN substrate 101 varies due to a constant current. Detecting the variation of applied voltages (the number of applied pulses) can determine the state of the formation of a polarization inversion structure. Polarization inverting apparatus 200 (see in FIG. 2) applies a high voltage to MgLN substrate 101 to control at a constant value the electric current that flows when the polarization inversion structure is produced. Applied voltage monitor 202 monitors the voltage applied to MgLN substrate 101. Applied voltage monitor 202 can thus monitor the state of the forming process of the polarization inversion structure in MgLN substrate 101.

Comparison of FIG. 8(a) with FIG. 8(b) indicates that the voltage at the initial stage of forming polarization inversion exceeds 2 kV in FIG. 8(a) where the target conversion efficiency is achieved, while the voltage at the initial stage of forming polarization inversion is as low as approximately 1.8 kV in FIG. 8(b) where the target conversion efficiency is not achieved.

Polarization inverting apparatus 200 controls the electric current that flows across the substrate to be kept constant as shown in FIG. 2. The substrate resistance in FIG. 8(b) where the target conversion efficiency is not achieved is therefore smaller than that in FIG. 8(a) where the target conversion efficiency is achieved. Further study revealed that voltages (substrate resistance) at the initial stage of forming polarization inversion vary and wavelength conversion characteristics also vary broadly depending on storage condition of substrates and process history after the wavelength conversion element is formed.

Removal of electronic defects in MgLn substrate 101 is attempted by heat treatment, assuming that the defects result in a variation in substrate resistance.

Figure 9:
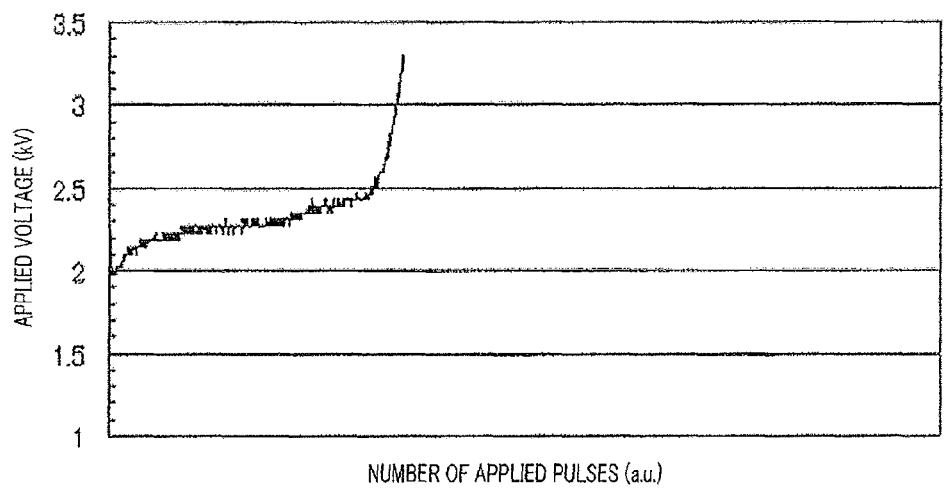
FIG. 9 includes characteristic diagrams of the SHG element manufactured by the method of manufacturing the wavelength conversion element according to Embodiment 1.
Figure 9:
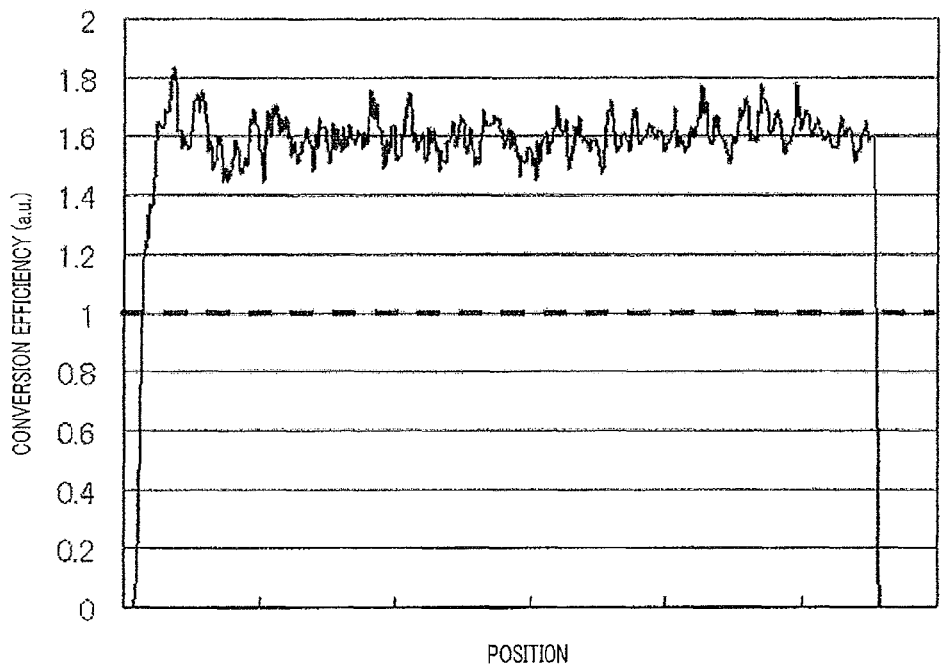

FIG. 9 includes characteristic charts of an SHG element manufactured by the method according to the present embodiment. FIG. 9(a) indicates the relationship between the applied voltages and the number of the applied pulses, and FIG. 9(b) indicates the relationship between wavelength conversion efficiency and the incident position of a fundamental wave.

FIG. 9(a) is a chart plotting applied voltages across the substrate versus the number of applied pulses to form polarization inversion after heat treatment at a process temperature tmax of 200° C. and a processing time T of 1 hour. FIG. 9(b) shows the observed wavelength conversion efficiency of the element.

As shown in FIG. 9(a), heat treatment before applying the electric field in the method of manufacturing the wavelength conversion element results in a voltage of approximately 2 kV at the initial stage of the polarization inversion. Furthermore, wavelength conversion characteristics and in-plane distribution of the element are approximately 1.6, which far exceed the target conversion efficiency, approaching the ideal conversion efficiency.

Figure 11:
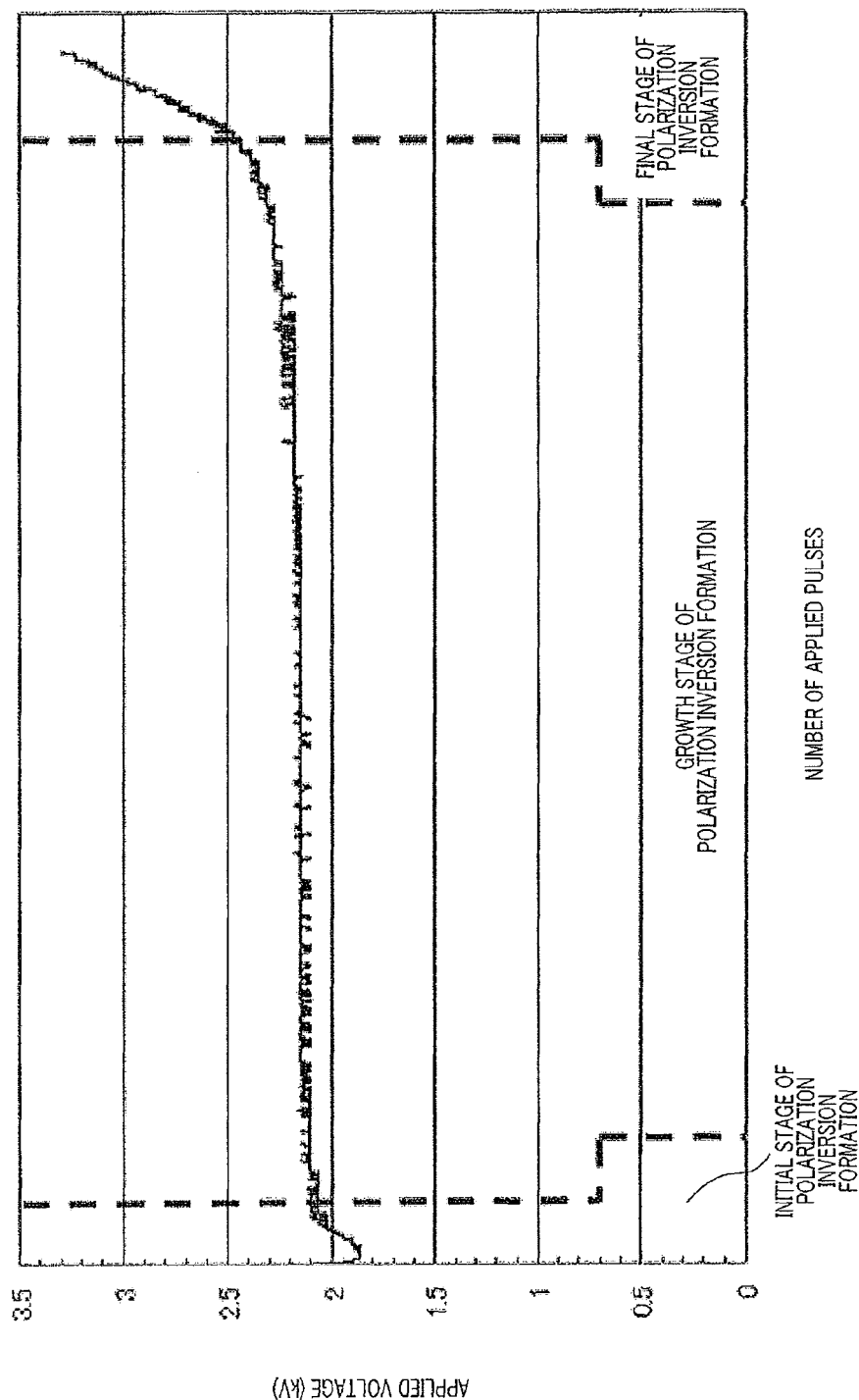
FIG. 11 is a graph showing a formation process of a polarization inversion structure based on the relationship of the applied voltages versus the number of the applied pulses of the wavelength conversion element produced by the method according to Embodiment 1.

FIG. 11 is a graph showing a formation process of a polarization inversion structure based on the relationship between the applied voltages and the number of the applied pulses of the wavelength conversion element produced by the method according to the present embodiment.

Figure 10:
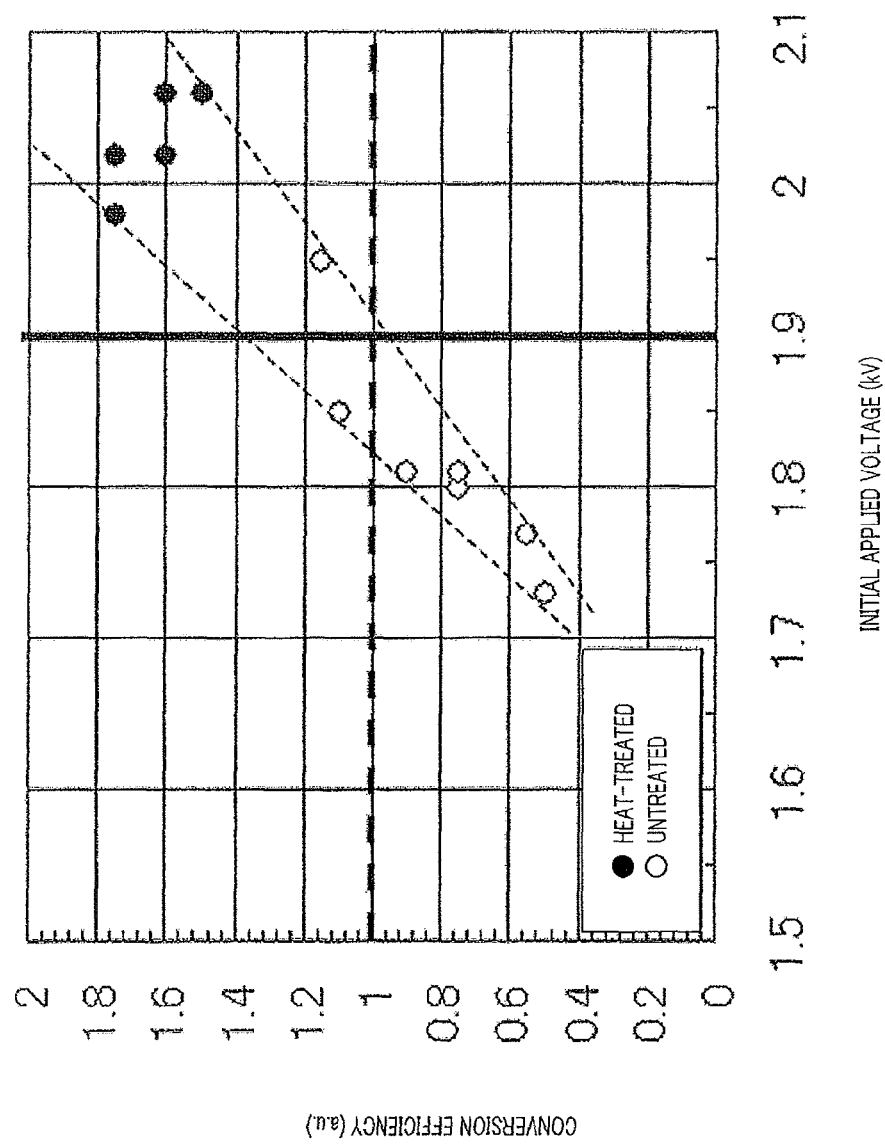
FIG. 10 is a graph showing the relationship of wavelength conversion efficiency versus initial applied voltage of the wavelength conversion element produced by the method according to Embodiment 1 when heat treatment is performed or not before application of the electric field.

FIG. 10 is a chart plotting a variation in the conversion efficiency depending on the presence or absence of the heat treatment. White circles in FIG. 10 indicating the untreated sample shows a variable initial applied voltage in the range of 1.7 to 1.95 kV and a variable conversion efficiency of the wavelength conversion element in the range of 0.5 to 1.1.

Black circles in FIG. 10 shows the initial applied voltage and the conversion efficiency when the heat treatment is introduced before application of the electric field in the method of manufacturing the wavelength conversion element. Introducing the heat treatment before application of the electric field in the method of manufacturing the wavelength conversion element reduces a variation in the initial applied voltages to 1.98 to 2.06 kV, and provides a conversion efficiency of 1.5 to 1.8, which is greater than that when no heat treatment is performed before application of the electric field.

FIG. 10 also shows that the initial applied voltage must be 1.9 kV or more so that the conversion efficiency exceeds the target level (see the dashed line in FIG. 10).

This shows that the control of an initial applied voltage to form polarization inversion enables the efficiency of a wavelength conversion element to increase.

Applied voltage monitor 202 of polarization inverting apparatus 200 (see FIG. 2) is used to control the initial applied voltage to form polarization inversion. Applied voltage monitor 202 monitors the state of the process of forming the polarization inversion structure in MgLN substrate 101. Applied voltage monitor 202 can be used to estimate the growing state of a polarization inversion portion inside the substrate during the forming step of the polarization inversion.

A method of estimating the growing state of the polarization inversion portion from an applied voltage is now described.

FIG. 11 is a graph showing the relationship between the wavelength conversion efficiency and the initial applied voltage of the wavelength conversion element produced by the method according to the present embodiment when heat treatment is performed or not before application of the electric field.

As shown in FIG. 11, the inventor found that polarization inversion formation consists of three periods of an initial stage, a growth stage, and a final stage.

At the initial stage of the polarization inversion formation, the applied voltage once decreases from the beginning of the application, then increases gradually, and becomes constant at a certain level.

At the growth stage of the polarization inversion formation, the applied voltage is kept constant after the initial stage. The growth stage of the polarization inversion is believed to be a process of the polarization inversion that propagates in the depth direction of MgLN substrate 101.

At the final stage of the polarization inversion formation, the applied voltage increases again after the polarization inversion formation. The application of the electric field is stopped at the final stage of the polarization inversion formation, to prevent the excess formation of the polarization inversion structure causing a decrease in wavelength conversion efficiency.

The results of relationship of the initial applied voltage and the conversion efficiency shown in FIG. 10 demonstrates that the applied voltage needs to be 1.9 kV or more at the initial stage of the polarization inversion formation and is preferably 2.5 to 3.5 kV at the final stage, in order to obtain a high conversion efficiency.

In terms of the volume resistivity (between the +z face and the −z face, and at a measurement temperature of 100° C. or higher) of MgLN substrate 101 corresponding to the applied voltage, the volume resistivity needs to be 6.5 MΩ·cm or more at the initial stage of the polarization inversion formation, and preferably ranges from 9 to 15 MΩ·cm after polarization inversion is formed.

Figure 12:
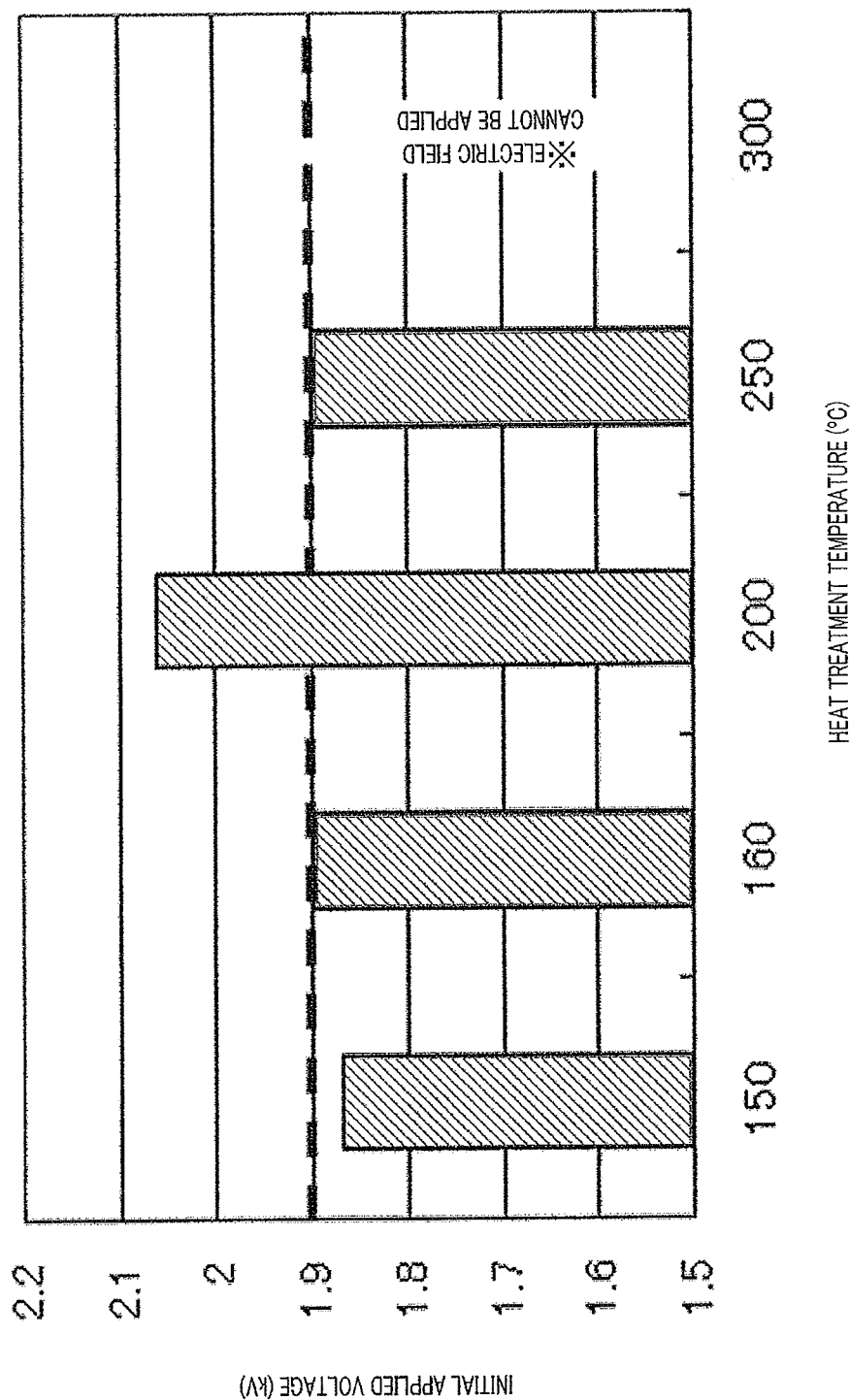
FIG. 12 is a graph showing the relationship between heat treatment temperatures before an electric field is applied and initial applied voltage in the method of manufacturing the wavelength conversion element according to Embodiment 1.

FIG. 12 is a graph showing the relationship between the heat treatment temperatures before an electric field is applied and the initial applied voltage.

The heat treatment condition (holding temperature tmax) to increase the applied voltage to 1.9 kV or more at the initial stage of the polarization inversion formation will now be described with reference to FIG. 12.

As shown in FIG. 12, the initial applied voltage does not reach 1.9 kV at a heat treatment temperature of 150° C., while a desired applied voltage is achieved at a heat treatment temperature of 160 to 250° C. Thus the heat treatment temperature preferably ranges from 160 to 250° C. The electric field cannot be applied due to the deterioration of electrodes at a heat treatment temperature higher than 250° C. The heat treatment is therefore not available at a temperature higher than 250° C.

Figure 13:
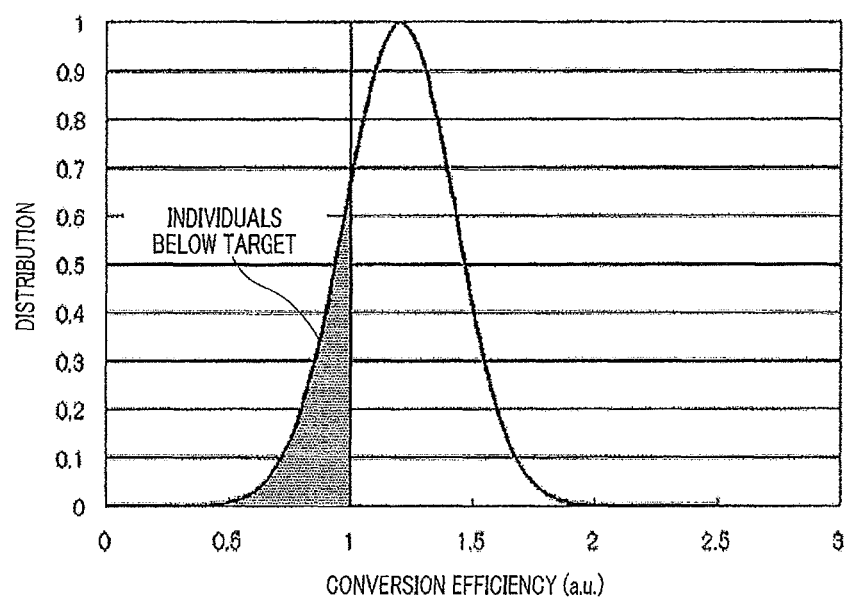
FIG. 13 includes the frequency distribution graphs showing the wavelength conversion efficiency of the wavelength conversion element manufactured by the method according to Embodiment 1 when the wavelength conversion element is heat-treated before applying the electric field or not.
Figure 13:
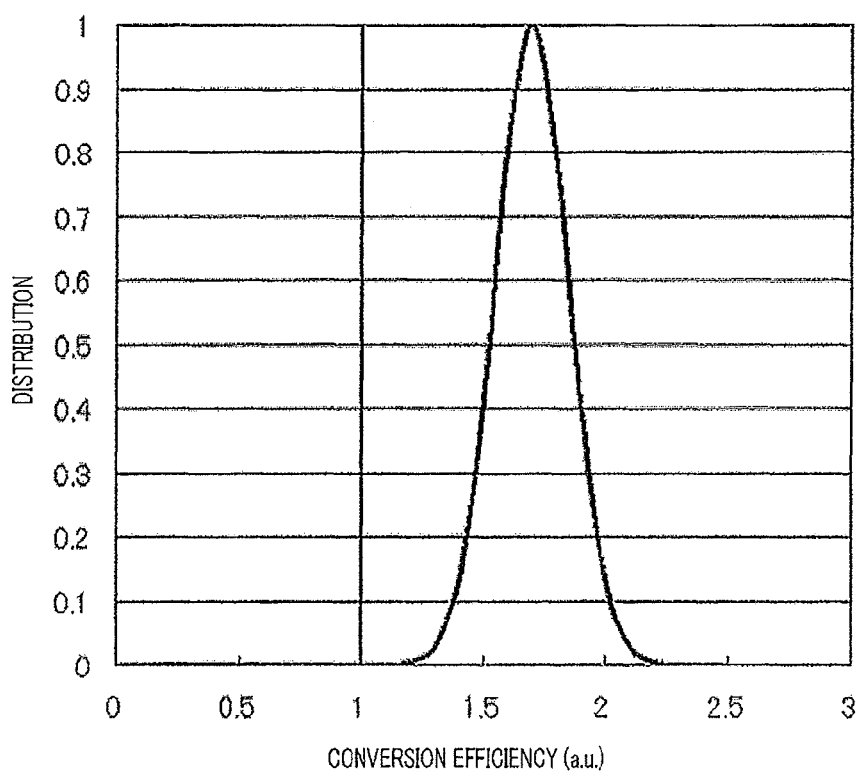

FIG. 13 includes frequency distribution graphs showing the wavelength conversion efficiency when the heat treatment is performed or not performed before applying the electric field. FIG. 13(a) shows the frequency distribution of conversion efficiency of the wavelength conversion element when the heat treatment was not introduced before inverting polarization, and FIG. 13(b) shows the frequency distribution of conversion efficiency of the wavelength conversion element according to the present embodiment when the heat treatment was introduced before inverting polarization.

As shown in FIG. 13(a), when no heat treatment is introduced before inverting polarization, the peak value of the conversion efficiency at which the largest number of individuals are present is low (approximately 1.2 a.u.) and the variation in the conversion efficiency is large (frequency distribution is broad). Thus the individuals below the target conversion efficiency (1.0 a.u.) occur as shown by a shaded area in FIG. 13(a).

As shown in FIG. 13(b), when the heat treatment is introduced before inverting polarization according to the present embodiment, the peak value of the conversion efficiency can be increased, while the variation in the conversion efficiency can be decreased. Thus the present embodiment has a benefit of increasing a yield corresponding to the number of individuals exceeding the target conversion efficiency.

As described in detail above, a method of manufacturing a wavelength conversion element according to the present embodiment includes the steps of: forming periodic electrodes 103 on the +z face of MgLN substrate 101 and forming opposite electrode 104 on the −z face of MgLN substrate 101; heat-treating the substrate after forming periodic electrodes 103 and opposite electrode 104; and applying a pulsed electric field between periodic electrodes 103 and opposite electrode 104 while holding MgLN substrate 101 at a temperature of 100° C. or higher. That is, the method of manufacturing a wavelength conversion element according to the present embodiment performs heat treatment without removing periodic electrodes 103 and opposite electrode 104, and applies an electric field across periodic electrodes 103 and opposite electrode 104 after the heat treatment to form a polarization inversion structure.

In wavelength conversion element 100 according to the present embodiment, heat-treated MgLN substrate 101 is provided with the polarization inversion structure formed by applying an electric field. The wavelength conversion element 100 provided with the polarization inversion structure has a volume resistivity between the +z face and the −z face of MgLN substrate 101 in the range of 9 to 5 MΩ·cm at a substrate temperature of 100° C. or higher.

The present embodiment stably produces highly efficient wavelength conversion elements using MgLN substrates 101 with a mole fraction of 0.485 to 0.49 (congruent composition) that are conventionally manufactured, rather than using a specific stoichiometric composition.

Specifically, the method of manufacturing a wavelength conversion element according to the present embodiment applies an electric field across periodic electrodes 103 and opposite electrode 104 after the heat treatment to control the process of forming the polarization inversion structure, using MgLN substrate 101 with a congruent composition. Heat treatment in that order can reduce crystal defects caused by light that were generated before forming the polarization inversion.

According to the method of a wavelength conversion element in the present embodiment, the resistance of MgLN substrate 101 can be stabilized when the electric field is applied. As a result, wavelength conversion elements having a high conversion efficiency can be manufactured stably, and wavelength conversion elements having a high efficiency can also be obtained.

The method of manufacturing a wavelength conversion element described in PTL 3 involves forming a polarization inversion layer, and then performing heat treatment after removal of electrodes. In contrast, the method of manufacturing a wavelength conversion element according to the present embodiment involves performing heat treatment without removing electrodes, then applying an electric field using the electrodes to form a polarization inversion layer, and finally removing the electrodes. This differs from the conventional method in the object and the order of heat treatment process. The temperature of the heat treatment in the method of manufacturing a wavelength conversion element described in PTL 3 is 85° C. or lower, while the temperature of the heat treatment in the method of manufacturing a wavelength conversion element according to the present embodiment is 100° C. or higher (more specifically, in the range of 160° C. to 250° C.). That is, heat treatment conditions are also different from each other.

The method of manufacturing a wavelength conversion element described in PTL 3 intends to prevent the instability of output due to a temporal change in the phase matching temperature and a decrease in conversion efficiency caused thereby, while the present invention intends to improve the production yield. PTL 3 shows that a heat treatment temperature of 100° C. or higher reduces a change in refractive index due to radiating light (light damaging). The method of manufacturing a wavelength conversion element according to the present embodiment involves performing heat treatment after electrodes are formed, and forming a polarization inversion structure in a heat-treated substrate. The inventor has discovered the heat treatment after formation of the electrodes, i.e., before formation of the polarization inversion, in order to reduce crystal defects caused by light that were generated before formation of the polarization inversion. The present invention makes it possible for the first time to improve the production yield as shown in FIG. 13.

(Embodiment 2)

Figure 14:
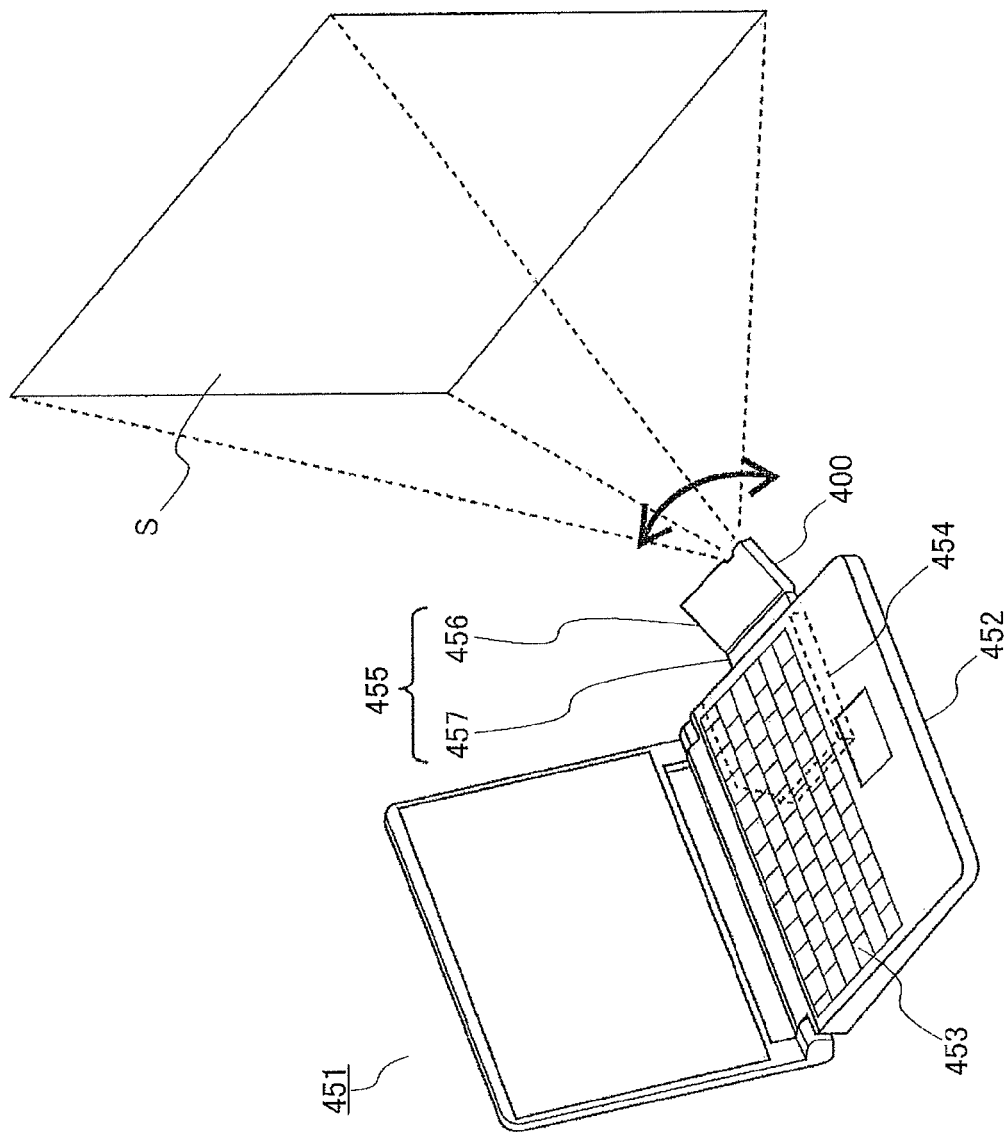
FIG. 14 is a perspective view of an image display apparatus having a laser light source apparatus provided with a wavelength conversion element according to Embodiment 2 of the present invention.

FIG. 14 is a perspective view of an image display apparatus that is provided with a laser light source apparatus having a wavelength conversion element according to Embodiment 2 of the present invention. The present embodiment is an example that applies the image display apparatus according to the present invention to a mobile data processing unit.

Mobile data processing unit 451 has a built-in image display apparatus 400 as shown in FIG. 14. Body 452 of mobile data processing unit 451 has a space to house replaceable peripherals such as an optical disc drive, i.e., a drive bay, on the back side of keyboard 453. Retractable image display apparatus 400 is mounted in the drive bay.

Image display apparatus 400 has recess 454 and movable member 455 that can be detachable from recess 454. Movable member 455 includes optical engine unit 456 that houses optical components for projecting laser light on screen S, and control unit 457 that houses a circuit board for controlling the optical components in optical engine unit 456. Optical engine unit 456 is supported by control unit 457 so as to be rotationally moved in the vertical direction.

Movable member 455 is stored in recess 454 when image display apparatus 400 is not in use. Movable member 455 is pulled out of recess 454 before image display apparatus 400 is used. A user rotationally moves optical engine unit 456, and adjusts the projection angle of the laser light from optical engine unit 456. This adjustment enables the laser light to be properly projected on screen S.

Figure 15:
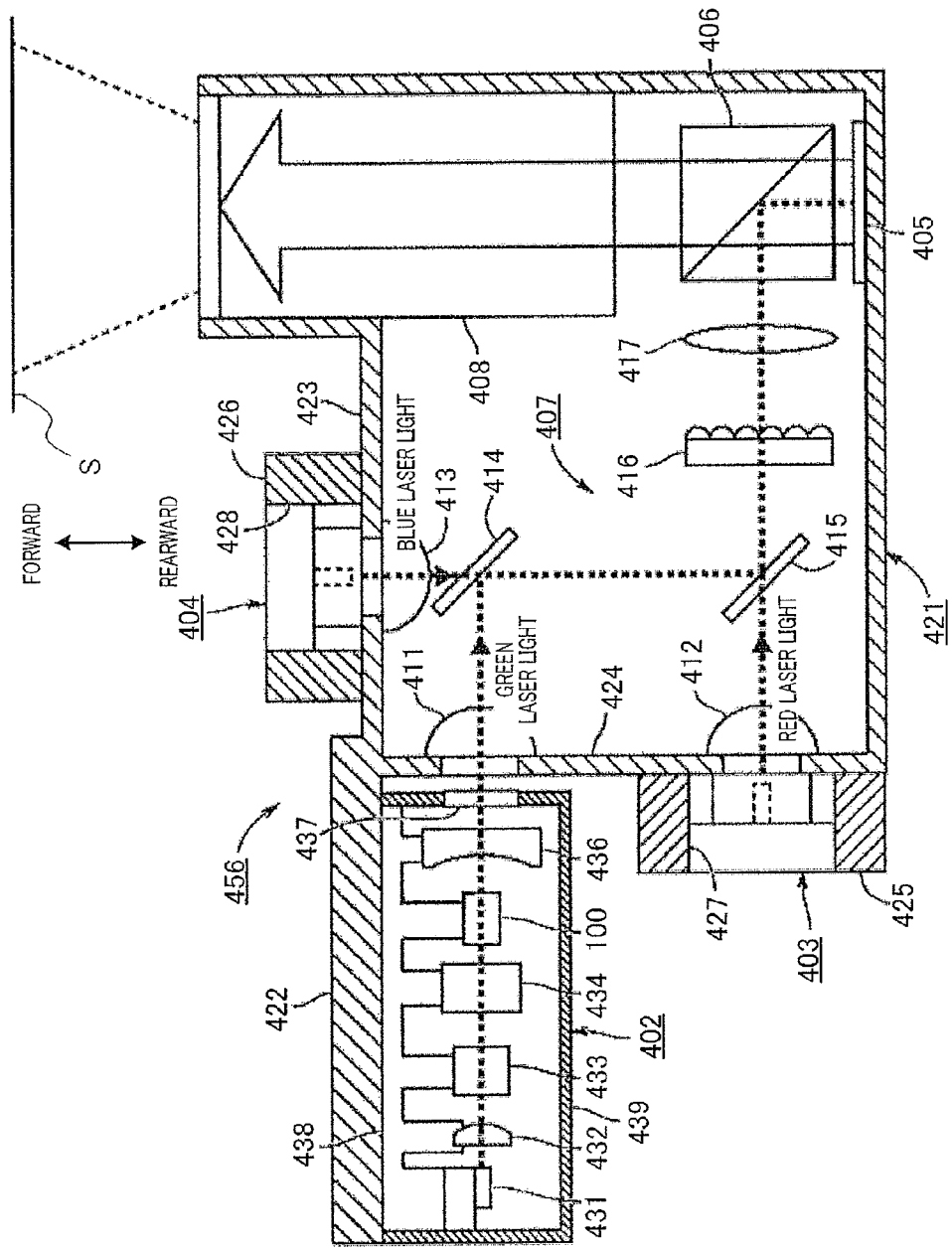
FIG. 15 is a schematic view illustrating an optical engine unit of the image display apparatus according to Embodiment 2.

FIG. 15 is a schematic view illustrating the outline configuration of optical engine unit 456 of image display apparatus 400.

Optical engine unit 456 projects a required image on a screen as shown in FIG. 15.

Optical engine unit 456 includes green laser light source apparatus 402 for outputting green laser light; red laser light source apparatus 403 for outputting red laser light; blue laser light source apparatus 404 for outputting blue laser light; and reflective liquid crystal spatial light modulator 405 that modulates the laser light from laser light source apparatuses 402-404 in response to video signals. Optical engine unit 456 also includes polarizing beam splitter 406, relay optical system 407, and projection optical system 408. Polarizing beam splitter 406 reflects the laser light from laser light source apparatuses 402-404 toward spatial light modulator 405, and transmits modulated laser light from spatial light modulator 405. Relay optical system 407 guides the laser light from laser light source apparatuses 402-404 to polarizing beam splitter 406. Projection optical system 408 projects the modulated laser light through polarizing beam splitter 406 on the screen.

Optical engine unit 456 displays a color image by so-called field-sequential scheme. Laser light source apparatuses 402-404 output the respective laser light beams sequentially on a time division basis, and an image created by these laser light beams is recognized as a color image by visual afterimage effect.

Relay optical system 407 includes: collimator lenses 411-413 for converting each laser light beam from laser light source apparatuses 402-404 into parallel beams; first and second dichroic mirrors 414 and 415 for guiding the laser light beams through collimator lenses 411-413 to a target direction; diffuser plate 416 for diffusing the laser light guided by dichroic mirrors 414 and 415; and field lens 417 for converting the laser light through diffuser plate 416 into a focused laser beam.

Given that the front is the side on which the laser light is emitted from projection optical system 408 toward screen S, blue laser light is emitted from blue laser light source apparatus 404 to the rearward. Green laser light source apparatus 402 and red laser light source apparatus 403 emit green laser light and red laser light, respectively, such that optical axes of green laser light and red laser light are orthogonal to the optical axis of the blue laser light. The blue laser light, the red laser light, and the green laser light are guided into the same optical path by two dichroic mirrors 414 and 415. That is, first dichroic mirror 414 guides the blue laser light and the green laser light into the same optical path, and second dichroic mirror 415 guides the blue laser light and the green laser light, and the red laser light into the same optical path.

First and second dichroic mirrors 414 and 415 have films to transmit or reflect laser light having predetermined wavelengths on their surfaces. First dichroic mirror 414 transmits the blue laser light but reflects the green laser light. Second dichroic mirror 415 transmits the red laser light but reflects the blue laser light and the green laser light.

These optical components are mounted in housing 421. Housing 421, which is composed of a material having high thermal conductivity such as aluminum or copper, functions as a heat dissipator to dissipate heat generated in laser light source apparatuses 402-404.

Green laser light source apparatus 402 is attached to fitting 422 projecting laterally from housing 421. Fitting 422 projects perpendicular to side wall 424 from the corner at which front wall 423 located in front of the housing space for relay optical system 407 intersects side wall 424 located at the side of the housing space. Red laser light source apparatus 403 is held by holder 425 attached to the outside of side wall 424. Blue laser light source apparatus 404 is held by holder 426 attached to the outside of front wall 423.

Red laser light source apparatus 403 and blue laser light source apparatus 404 are provided with so-called CAN packages. A CAN package, where the optical axis of a laser chip for outputting laser light is disposed at a central axis of a can-type armor with the laser chip being supported on a stem, emits laser light through a glass window provided in an opening of the armor.

Red laser light source apparatus 403 is fixed to attachment hole 427 of holder 425, for example, by press fitting. Blue laser light source apparatus 404 is also fixed to attachment hole 428 of holder 426, for example, by press fitting. The heat of laser chips in blue laser light source apparatus 404 and red laser light source apparatus 403 is dissipated through holders 425 and 426 and housing 421. Holders 425 and 426 are composed of a highly thermally conductive material such as aluminum or copper.

Green laser light source apparatus 402 includes semiconductor laser 431 for emitting excitation laser light; fast-axis collimator (FAC) lens 432 and rod lens 433 as collecting lenses for collecting the excitation laser light from semiconductor laser 431; and solid-state laser element 434 for outputting fundamental laser light (infrared laser light) excited by the excitation laser light. Green laser light source apparatus 402 also includes: wavelength conversion element (optical element) 100 (see FIG. 2) for converting the wavelength of the fundamental laser light to output half-wavelength laser light (green laser light); concave mirror 436 building up a resonator with solid-state laser element 434; glass cover 437 for preventing leakage of the excitation laser light and the fundamental wavelength laser light; base 438 for supporting the components; and cover 439 for covering the components.

Green laser light source apparatus 402 is fixed by mounting base 438 on fitting 422 of housing 421, and a gap having a given width (for example, 0.5 mm or less) is provided between green laser light source apparatus 402 and side wall 424 of housing 421. This blocks transmission of the heat of green laser light source apparatus 402 to red laser light source apparatus 403, and suppresses a temperature rise of red laser light source apparatus 403, thus achieving a stable operation of red laser light source apparatus 403 having undesirable temperature characteristics. In order to keep a given clearance for optical axis adjustment (for example, approximately 0.3 mm) for red laser light source apparatus 403, a gap with a given width (for example, 0.3 mm or more) is also provided between green laser light source apparatus 402 and red laser light source apparatus 403.

According to the present embodiment, green laser light source apparatus 402 is provided with wavelength conversion element 100 (see FIG. 2) according to Embodiment 1. Green laser light source apparatus 402, red laser light source apparatus 403, and blue laser light source apparatus 404 are mounted as laser light sources on image display apparatus 400. An image display apparatus with a time-division display scheme is useful, which is provided with laser light source apparatuses including, in particular, the semiconductor laser as light sources. Image display apparatus 400 may be applied to general image display apparatuses such as projection image display apparatuses, LCD television sets, and LCD displays.

An image display apparatus is not limited to the projection type, and an LCD television and an LCD display, for example, where a display image is directly watched may be used as the image display apparatus.

The description above shows the preferred illustrative embodiments of the present invention, and the scope of the invention should not be limited to the embodiments set forth herein.

The present embodiment stably produces highly efficient wavelength conversion elements using magnesium-doped lithium niobate or magnesium-doped lithium tantalate with a mole fraction of 0.485 to 0.49 (congruent composition) that has been conventionally manufactured, rather than using a specific stoichiometric composition.

Here, magnesium-doped lithium niobate is preferably a substrate of single crystalline magnesium-doped lithium niobate with a mole fraction of 0.485 to 0.49 (congruent composition).

The embodiments above are explained by a method of manufacturing the wavelength conversion element, a wavelength conversion element, a laser light source apparatus, and an image display apparatus. These are for explanation only, and therefore they may be a method of manufacturing an optical functional element, an optical semiconductor element, a display apparatus, and a liquid crystal apparatus, for example.

Furthermore, processes constituting the method of manufacturing the wavelength conversion element, such as types and methods of heat treatment are not limited to the above embodiments.

INDUSTRIAL APPLICABILITY

The wavelength conversion element, laser light source apparatus, image display apparatus, and method of manufacturing the wavelength conversion element according to the present invention are generally applicable to a wavelength conversion element having a periodic polarization inversion structure and a method of manufacturing the same. The wavelength conversion element and the method of manufacturing a wavelength conversion element according to the present embodiment facilitates the control of the formation process of a polarization inversion structure using single crystalline magnesium-doped lithium niobate having a congruent composition that has been commercially available. As a result, wavelength conversion elements having a high conversion efficiency can be manufactured stably, and wavelength conversion elements having a high efficiency can also be provided. Such wavelength conversion elements are useful as wavelength conversion laser light sources.

REFERENCE SIGNS LIST 100, 100A: Wavelength conversion element
101: Substrate (MgLN substrate) of single crystalline magnesium-doped lithium niobate with a mole fraction of 0.485 to 0.49 (congruent composition)
102: Polarization inversion region (polarization inversion layer)
103: Periodic electrode
104: Opposite electrode
200: Polarization inverting apparatus
201: DC current source
202: Applied voltage monitor
203: Waveform generator
204: Amplifier
300: Optical system to evaluate wavelength conversion efficiency
301: Fundamental wave light source
303: Power meter
304: Beam splitter
305: Collecting lens
307: Power meter to monitor green light
400: Image display apparatus
402: Green laser light source apparatus
403: Red laser light source apparatus
404: Blue laser light source apparatus
405: Spatial light modulator
406: Polarizing beam splitter
407: Relay optical system
408: Projection optical system
411-413: Collimator lens
414, 415: First dichroic mirror and second dichroic mirror
416: Diffuser plate
417: Field lens
431: Semiconductor laser
432: FAC lens
433: Rod lens
434: Solid-state laser element
436: Concave mirror
437: Glass cover
451: Mobile data processing unit
456: Optical engine unit
457: Control unit

The invention claimed is:

1. A method of manufacturing a wavelength conversion element that forms a polarization inversion structure on a substrate of single crystalline magnesium-doped lithium niobate having a congruent composition, comprising:
    cleaning the substrate of single crystalline magnesium-doped lithium niobate having a congruent composition;
    depositing a metal material on the front and rear surfaces of cleaned substrate;
    resist-patterning the metal-deposited substrate by photolithography;
    forming periodic electrodes on a +z face of the substrate and forming an opposite electrode on a −z face of the substrate as an electrode pattern for applying an electric field is formed by etching a metal film through a mask of the patterned resist;
    heat-treating the substrate immediately after forming the electrodes; and
    applying a pulsed electric field between the periodic electrodes and the opposite electrode after the heat treatment.

2. The method of manufacturing the wavelength conversion element according to claim 1, wherein:
    the heat-treating comprises performing heat treatment without removing the periodic electrodes and the opposite electrode;
    the applying the electric field comprises applying the electric field across the periodic electrodes and the opposite electrode after the heat treatment, and
    further comprising removing the periodic electrodes and the opposite electrode after the polarization inversion structure is formed by applying the electric field.

3. The method of manufacturing the wavelength conversion element according to claim 1, wherein:
    a heat treatment temperature in the step of heat-treating ranges from 160 to 250° C.

4. The method of manufacturing the wavelength conversion element according to claim 1, wherein:
    the applying the electric field comprises applying the pulsed electric field between the periodic electrodes and the opposite electrode while holding the substrate at a temperature of 100° C. or higher.

5. The method of manufacturing the wavelength conversion element according to claim 1, wherein:
    the applying the electric field comprises monitoring an applied voltage across the substrate during the heat treatment.

6. The method of manufacturing the wavelength conversion element according to claim 1, wherein:
an applied voltage in the step of applying the electric field ranges from 1.9 to 3.5 kV.

7. The method of manufacturing the wavelength conversion element according to claim 1, wherein:
the applying the electric field comprises detecting that an applied voltage ranges from 2.5 to 3.5 kV to finish the step of applying the electric field.

8. The method of manufacturing the wavelength conversion element according to claim 1, wherein:
a volume resistivity before application of the electric field and between the +z face and the −z face of the substrate is 6.5 MΩ·cm or more at a substrate temperature of 100° C. or higher.

9. The method of manufacturing the wavelength conversion element according to claim 1, wherein:
the congruent composition has a mole fraction of 0.485 to 0.49.

10. A wavelength conversion element having a polarization inversion structure formed on a substrate of single crystalline magnesium-doped lithium niobate having a congruent composition,
the wavelength conversion element having a volume resistivity between the +z face and the −z face of the substrate in the range of 9 to 5 MΩ·cm at a substrate temperature of 100° C. or higher.

11. The wavelength conversion element according to claim 10, wherein:
the substrate after heat treatment is provided with the polarization inversion structure formed by applying an electric field.

12. A laser light source apparatus, comprising the wavelength conversion element according to claim 10.

13. An image display apparatus, comprising the laser light source apparatus according to claim 12.

* * * * *